United States Patent [19]
Rampold

[11] Patent Number: 6,094,036
[45] Date of Patent: Jul. 25, 2000

[54] ELECTRICAL POWER SUPPLY WITH LOW-LOSS INRUSH CURRENT LIMITER AND STEP-UP CONVERTER CIRCUIT

[75] Inventor: Andreas Rampold, Mittweida, Germany

[73] Assignee: Siemens Aktiengesellschaft, Munich, Germany

[21] Appl. No.: 09/092,089

[22] Filed: Jun. 5, 1998

Related U.S. Application Data

[63] Continuation of application No. PCT/DE96/02261, Nov. 25, 1996.

[30] Foreign Application Priority Data

Dec. 5, 1995 [DE] Germany ............... 295 19 343 U

[51] Int. Cl.[7] .............................. G05F 1/52; H02H 7/10
[52] U.S. Cl. ........................ 323/266; 363/49; 363/50; 323/908
[58] Field of Search ................................ 323/222, 265, 323/266, 270, 271, 282, 901, 908, 299; 363/39, 49, 50; 361/93, 111

[56] References Cited

U.S. PATENT DOCUMENTS

| | | | |
|---|---|---|---|
| 5,122,724 | 6/1992 | Criss | 323/222 |
| 5,216,586 | 6/1993 | Saito | 363/49 |
| 5,420,780 | 5/1995 | Bernstein et al. | 363/89 |
| 5,786,685 | 7/1998 | Lange et al. | 323/270 |
| 5,796,182 | 8/1998 | Martin | 307/66 |
| 5,834,924 | 11/1998 | Konopka et al. | 323/222 |

FOREIGN PATENT DOCUMENTS

| | | |
|---|---|---|
| 0423885 | 4/1991 | European Pat. Off. . |
| 0637118 | 2/1995 | European Pat. Off. . |
| 0748035 | 12/1996 | European Pat. Off. . |
| 3728809 | 3/1989 | Germany . |
| 4233616 | 9/1994 | Germany . |
| WO9508862 | 3/1995 | WIPO . |

OTHER PUBLICATIONS

Japanese Patent Abstract for JP 1–133567, published May 25, 1989.
Japanese Patent Abstract for JP 5–38139, published Feb. 12, 1993.

*Primary Examiner*—Jessica Han
*Attorney, Agent, or Firm*—Sughrue, Mion, Zinn, Macpeak & Seas, PLLC

[57] ABSTRACT

An electrical power supply (EPS) including a voltage regulator (SR1) and an inrush current limiter (ICL1) having a current limiting circuit (CL1) and a support capacitor (C1). Charging current spikes produced in particular when the electrical power supply (EPS) is switched on are limited by the current limiting circuit (CL1). The current limiting circuit (CL1) is connected in series with the support capacitor (C1), thus preventing load current from flowing through the current limiting circuit. A step-up converter circuit (SUC) is connected upstream of the current limiting circuit (CL1) with the particular purpose of increasing the voltage (V). An advantage of the arrangement is that, due to the step-up converter circuit (SUC), the support capacitor (C1) has considerably improved support characteristics with regard to the switching regulator (SR1). Furthermore, the boosted voltage (V) at the terminals (T1 and T3) of the inrush current limiter (ICL1) considerably reduces the disruptive effects of interference voltages caused by the switching regulator (SR1). Additional interference suppression, e.g., by means of a costly radiointerference suppression network, is thereby advantageously rendered unnecessary.

12 Claims, 2 Drawing Sheets

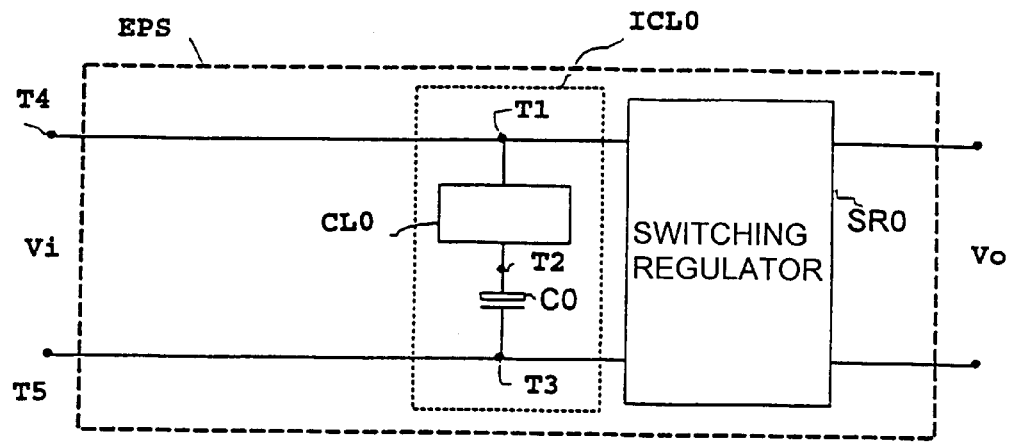
CONVENTIONAL Fig. 1
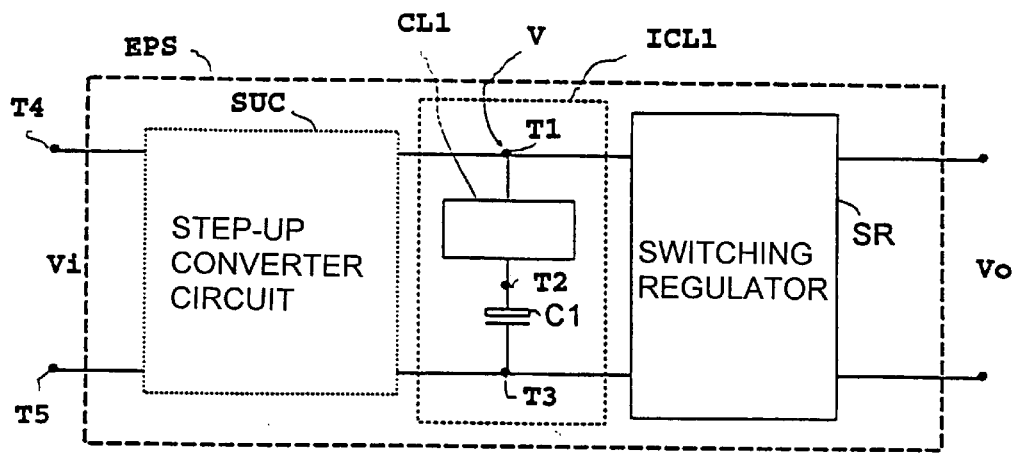
Fig. 2
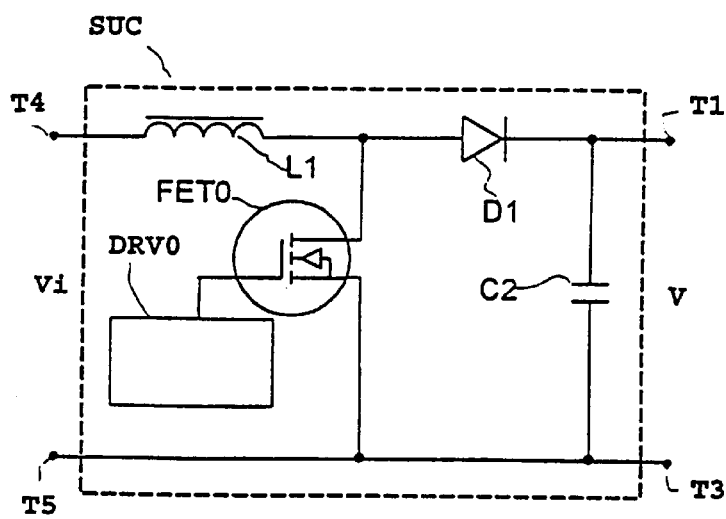
Fig. 3

ELECTRICAL POWER SUPPLY WITH LOW-LOSS INRUSH CURRENT LIMITER AND STEP-UP CONVERTER CIRCUIT

This is a Continuation of International Application PCT/DE96/02261, with an international filing date of Nov. 25, 1996, the disclosure of which is incorporated into this application by reference.

FIELD OF AND BACKGROUND OF THE INVENTION

The invention relates to new and useful improvements in electrical power supplies. More particularly, the invention relates to an electrical power supply with a low-loss inrush current limiter and a step-up converter circuit.

Electrical power supply units require special precautions to minimize the loads on the power supply grid caused when the units are switched on.

Patent Abstracts of Japan E-1387, Jun. 24, 1993, Vol. 17/No. 334, 5-38139 (A), discloses a rush-current limiting circuit for limiting the charging current of a series-connected smoothing capacitor when voltage is connected and in the event of voltage fluctuations. The load current of the load buffered by the smoothing capacitor does not flow through the current limiting circuit.

Patent Abstracts of Japan E-811, Aug. 24, 1989, Vol. 13/No. 383, 1-133567 (A), discloses a further current limiting circuit which is connected in series with a smoothing capacitor. Again, the load current of a load connected downstream does not flow through the current limiting circuit.

FIG. 1 illustrates a conventional electrical power supply EPS with an input voltage Vi and a regulated DC output voltage Vo. The input voltage Vi is either a DC voltage or, preferably, an unsmoothed voltage produced at the output of a rectifier (not illustrated). The electrical power supply EPS contains a switching regulator SR0. An inrush current limiter ICL0 is connected upstream of said switching regulator SR0, between its terminals T1 and T3. The inrush current limiter ICL0 has a current limiting circuit CL0 connected in series with a support capacitor C0, which serves the particular purpose of bridging momentary failures of the input voltage Vi applied to the input terminals T4 and T5. The support capacitor C0 generally has a high capacitance. Electrolytic capacitors are advantageously suitable for this purpose.

The support capacitor C0 is in the uncharged state before the electrical power supply EPS is switched on. During the switch-on process, the capacitor C0 is charged by means of the input voltage Vi. The charging current required for charging the support capacitor C0 is prevented from reaching excessively high peak values by the current limiting circuit CL0, which is connected in series with the support capacitor C0. As soon as the support capacitor C0 has reached its charged state, the current limiting circuit CL0 assumes a low internal resistance. The load current flowing through the input terminals T4 and T5 to the terminals T1 and T3 of the switching regulator SR0 does not pass through the current limiting circuit CL0, nor does it produce any further losses there.

A disadvantage of the arrangement is that overall the inrush current limiter ICL0 has an increased impedance, or an increased internal resistance, since the current limiting circuit CL0 is connected in series with the support capacitor C0. This increased impedance of the support capacitor C0 impairs the smoothing properties of this capacitor.

It is particularly disadvantageous that the support capacitor C0 is accordingly less able to buffer superposed interference voltages caused by the switching regulator SR0, such as so-called ripple voltages. These voltages are thus passed on to a greater extent to the input terminals T4, T5 of the electrical power supply EPS. Consequently, relatively costly radiointerference suppression may be needed to combat the superposed interference voltages that are passed on, to an increased extent, to the input terminals T4,T5.

OBJECTS OF THE INVENTION

It is therefore a first object of the invention to provide an electrical power supply with an inrush current limiter which is active only while the support capacitor is being charged, and assumes the lowest possible internal resistance during normal operation yet does not have to receive load current. It is a further object to circumvent the abovementioned disadvantages with regard to interference voltages.

SUMMARY OF THE INVENTION

These and other objects are achieved by an electrical power supply which includes: (a) a voltage regulator having input terminals; (b) an inrush current limiter connected upstream of and between the input terminals of the regulator, wherein the limiter has a support capacitor and a current limiting circuit connected in series with the support capacitor; and (c) a step-up converter circuit connected upstream of the inrush current limiter. Particularly advantageous refinements of the invention are the subject matter of the dependent claims.

The invention provides an electrical power supply with an inrush current limiter and improved buffering properties of the support capacitor, thereby eliminating the abovementioned disadvantages. To achieve this, the invention involves connecting a step-up converter circuit upstream of the inrush current limiter of the electrical power supply.

An advantage of the invention is that, due to the step-up converter circuit connected upstream, the increased interference voltage at the terminals T1 and T3 of the inrush current limiter is no longer passed on to the input terminals T4 and T5 of the electrical power supply EPS. Additional interference suppression by means of a costly radiointerference suppression network is thereby advantageously rendered unnecessary.

Another advantage of the invention is that the step-up converter circuit connected upstream of the inrush current limiter results in a boosted voltage at the terminals T1 and T3. Fluctuations in the input voltage Vi are compensated for in such a way that the support capacitor is always charged to the sate charge state. The support capacitor thus has a stable, known backup time that is independent of fluctuations in the input voltage Vi.

Yet another advantage of the step-up converter circuit connected, in accordance with the invention, upstream of the inrush current limiter is that the switching regulator need have only a small regulating range, owing to the constant voltage at the terminals T1 and T3.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

FIG. 1 shows a conventional electrical power supply having a switching regulator and an inrush current limiter connected upstream of the regulator, FIG. 2 shows, by way of example, an inventive electrical power supply with an inrush current limiter and a step-up converter circuit connected upstream of the regulator, FIG. 3 shows, by way of example, an embodiment of a step-up converter circuit or, given appropriate driving, of a so-called power factor controller circuit.

DETAILED DESCRIPTION OF THE PREFERRED EMBODIMENTS

Figure 4:
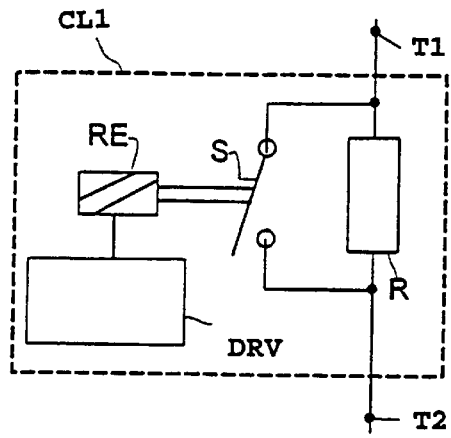
FIGS. 4–5 show first embodiment of an inrush current limiter, having switch-like properties.

FIG. 2 shows, by way of example, an inventive electrical power supply EPS having a voltage regulator, which may preferably take the form of a switching regulator SR1. An inrush current limiter ICL1 is connected upstream of the regulator at terminals T1 and T3. Furthermore, a step-up converter circuit SUC is connected upstream of the inrush current limiter ICL1. The step-up converter circuit is connected between the input terminals T4, T5 and the terminals T1, T3. The step-up converter circuit SUC connected upstream in this fashion results in a boosted voltage V, compared with the input voltage Vi, at the terminals T1 and T3 of the inrush current limiter ICL1.

The support capacitor C1 illustrated in FIG. 2 functions particularly well and advantageously as a result of the boosted voltage V. In particular, the step-up converter circuit SUC compensates for fluctuations in the input voltage Vi in such a way that the support capacitor C1 is always charged to the same charge state. Consequently, the support capacitor C1 has a stable, known backup time irrespective of fluctuations in the input voltage Vi.

Due to the step-up converter circuit SUC connected upstream, the interference voltage at the terminals T1, T3, which is produced by the switching regulator SR1 and is increased by the internal resistance of the current limiting circuit CL1, is not passed on to the input terminals T4 and T5. This eliminates the need for the interference voltage to be suppressed by additional radiointerference suppression networks.

FIG. 3 shows, by way of example, an embodiment of a step-up converter circuit SUC. In the embodiment shown, the step-up converter circuit SUC has an inductance L1 and a diode D1 connected in series therewith. The inductance and diode are connected between the input terminal T4 and the terminal T1. The step-up converter circuit SUC has a capacitance C2 in parallel with the terminals T1, T3. Furthermore, the input terminal T4 and the terminal T1 can be electrically short-circuited simultaneously via the inductance L1 and the diode D1, respectively, with the input terminal T5 and the terminal T3, respectively, by means of a semiconductor switch FET0. The semiconductor switch FET0 can be driven by a drive circuit DRV0. A high-frequency clock rate of the drive circuit DRV0 is a particular measure that enables a boosted voltage V to be produced across the capacitance C2 (connected between the terminals T1 and T3) compared with the input voltage Vi applied to the input terminals T4 and T5.

When unsmoothed, rectified AC voltage is applied to the input terminals T4, T5, the step-up converter circuit SUC may advantageously take the form of a so-called "power factor controller", given appropriate driving by means of the drive circuit DRV0. The driving is preferably such that the current taken up by the step-up converter circuit SUC is proportional to the input voltage Vi applied to the input terminals T4 and T5. The step-up converter circuit SUC in the form of a "power factor controller" thus behaves like a resistor.

FIG. 4 shows, by way of example, an embodiment of the current limiting circuit CL1 of the electrical power supply EPS according to the invention. In this case the current limiting circuit CL1 has properties comparable to those of a switch S. The inrush current limiter ICL1 has a resistor R. The resistor R, which can be bridged, is arranged between the terminals T1 and T2 and is connected in series with the support capacitor C1 illustrated in FIG. 2. The basic illustration of FIG. 4 shows a switch S for bridging the resistor R. The switch S can be switched by a drive arrangement DRV via a relay RE.

Figure 5:
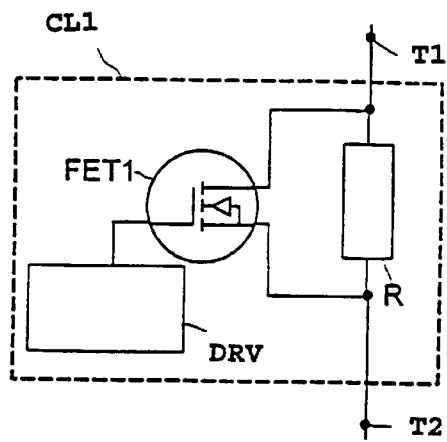

FIG. 5 illustrates an embodiment of the current limiting circuit CL1 in which the resistor R can be bridged by the electrodes of a semiconductor switching element. An especially suitable semiconductor switching element is a field-effect transistor FET1, such as a metal oxide field-effect transistor, whose drain and source terminals bridge the resistor R. During the switch-on process of the electrical power supply EPS, a drive arrangement DRV ensures that the field-effect transistor FET1 is in the OFF state while the support capacitor C1 is being charged. Once the charging operation is over, the drive arrangement DRV activates the field-effect transistor FET1 via its gate terminal. As a result of this, the field-effect transistor is turned ON and virtually short-circuits the resistor.

Figure 6:
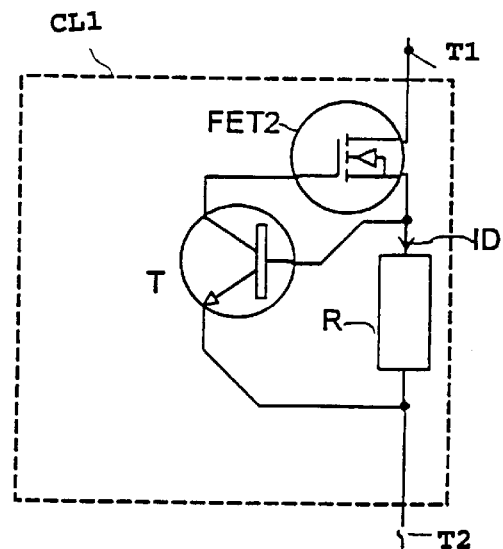
FIGS. 6–7 show further embodiments of inrush current limiting circuits, having current source properties.

FIG. 6 shows a further embodiment of the current limiting circuit CL1 of the electrical power supply EPS according to the invention. In this case the current limiting circuit CL1 has current source properties. In the embodiment illustrated in FIG. 6, a field-effect transistor FET2, preferably a metal oxide field-effect transistor, and a resistor R are arranged between the terminals T1 and T2, in series with the support capacitor C1 illustrated in FIG. 2. The drain current ID of the field-effect transistor FET2, which corresponds to the charging current of the support capacitor C1, flows from the terminal T1 through the drain and source terminals of FET2 and through the resistor R to the terminal T2. The voltage drop across this resistor is fed to the base and emitter terminals of a transistor T. The collector terminal of the latter is electrically connected to the gate terminal of the field-effect transistor FET2. The circuit CL1 thus assumes the properties of an electronically regulated current source.

The maximum permissible charging current of the support capacitor C1 is defined by the base-emitter forward voltage of the transistor T and the resistor R. The charging current is high at the beginning of the switch-on process of the electrical power supply EPS. As the drain current ID of the field-effect transistor FET2, this charging current produces a correspondingly high voltage drop across the resistor R, whereby the transistor T assumes an ON state. The gate-source voltage of the field-effect transistor FET2 is short-circuited as a result and increases the drain-source resistance of the field-effect transistor, thereby reducing the drain current ID and limiting the charging current of the capacitor as desired.

During normal operation, the support capacitor C1 is in the charged state. It is primarily smoothing currents, in particular "ripple currents", that flow through it. These currents are small in comparison to the charging current and so the field-effect transistor FET2 maintains an ON state. As a result, the inrush current limiter ICL1 maintains the low internal resistance desired during normal operation.

Figure 7:
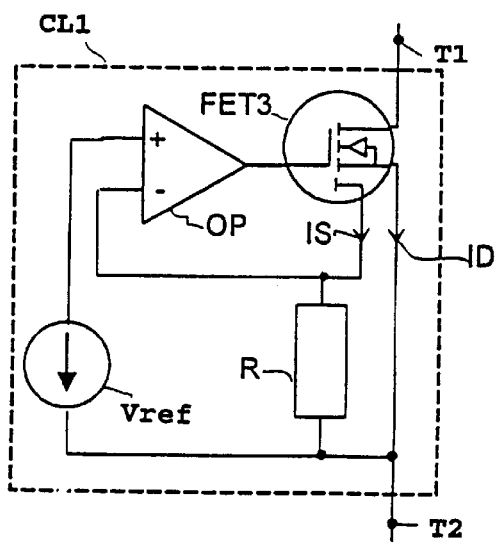

FIG. 7 shows another advantageous embodiment of the current limiting circuit CL1, which likewise has current source properties. This embodiment has a sense field-effect transistor FET3 in series with the support capacitor C1. The sense field-effect transistor FET3 is arranged between the terminals T1 and T2 by its drain and source terminals and contains a so-called sense electrode, through which a small control current IS proportional to its drain current ID is output. An operational amplifier OP compares the value of a reference voltage source Vref, which defines the maximum permissible charging current, with the voltage drop across the resistor R caused by the control current IS, and regulates the gate terminal of the sense field-effect transistor FET3 in such a way that the circuit CL1 assumes the properties of an electronically regulated current source.

If a high charging current of the support capacitor C1, and thus a high drain current ID, occurs during the switch-on process of the electrical power supply EPS, then a voltage potential exceeding the reference voltage Vref is present at the operational amplifier OP. This potential arises as a result of the control current IS, which is proportional to the drain current ID and flows through the resistor R. The sense field-effect transistor FET3 controlled by the operational amplifier OP consequently assumes a higher internal resistance, thereby limiting the charging current of the support capacitor C1 as desired.

The advantage of the arrangement is that the support capacitor C1 has considerably improved backup characteristics with regard to the switching regulator SR1. This results from the boosted voltage V caused by the step-up converter circuit SUC connected upstream of the inrush current limiter ICL1 and the switching regulator SR1 in accordance with the invention. Furthermore, the step-up converter circuit SUC considerably reduces the disruptive effects of interference voltages caused by the switching regulator SR1. Additional interference suppression by means of a costly radiointerference suppression network is thereby advantageously rendered unnecessary.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An electrical power supply comprising:
   a voltage regulator having input terminals;
   an inrush current limiter connected between the input terminals of said voltage regulator, said limiter comprising a support capacitor and a current limiting circuit connected in series with said support capacitor; and
   a step-up converter circuit connected upstream of said inrush current limiter.

2. The power supply as claimed in claim 1, wherein said voltage regulator is a switching regulator.

3. The power supply as claimed in claim 1, wherein said step-up converter circuit is a power factor controller.

4. The power supply as claimed in claim 1, wherein:
   said current limiting circuit comprises a resistor and a field-effect transistor; and
   said resistor is arranged in series with said support capacitor and is bridged by said field-effect transistor following completion of a switch-on operation of the electrical power supply.

5. The power supply as claimed in claim 4, wherein said current limiting circuit further comprises a drive arrangement for activating said transistor.

6. The power supply as claimed in claim 1, wherein:
   said current limiting circuit comprises a field-effect transistor, a resistor and a further transistor;
   said field-effect transistor and said resistor are arranged in series with said support capacitor; and
   said further transistor is connected with said field-effect transistor and said resistor such that said current limiting circuit functions as a current source.

7. The power supply as claimed in claim 6, wherein a voltage drop across said resistor controls said further transistor.

8. The power supply as claimed in claim 1, wherein:
   said current limiting circuit comprises a sense field-effect transistor comprising a sense electrode outputting a control current proportional to a drain current of said sense field-effect transistor;
   said sense field effect transistor is arranged in series with said support capacitor;
   said current limiting circuit further comprises an operational amplifier, a reference voltage source and a resistor; and
   said operational amplifier, said reference voltage source and said resistor are connected with said sense field-effect transistor such that said current limiting circuit functions as a current source.

9. The power supply as claimed in claim 8, wherein:
   a first input of said operational amplifier is connected to said reference voltage source; and
   a further input of said operational amplifier is supplied a voltage produced by the control current across said resistor.

10. The power supply as claimed in claim 1, wherein said current limiting circuit exhibits a high resistance while said support capacitor is charging during a switch-on process of said power supply, and a low resistance when said support capacitor is charged.

11. An electrical power supply comprising:
    a step-up converter circuit;
    an inrush current limiter connected downstream of said step-up converter circuit, said limiter comprising a support capacitor and a current limiting circuit connected in series with said support capacitor; and
    a voltage regulator connected downstream of said inrush current limiter, said voltage regulator having input terminals;
    wherein said inrush current limiter is connected to said input terminals, in parallel with said voltage regulator.

12. The electrical power supply as claimed in claim 11, wherein said current limiting circuit exhibits a high resistance while said support capacitor is charging during a switch-on process of said power supply, and a low resistance when said support capacitor is charged.

* * * * *